(12) United States Patent
Bouhraoua et al.

(10) Patent No.: US 8,776,917 B2
(45) Date of Patent: Jul. 15, 2014

(54) STAIR-CLIMBING APPARATUS

(71) Applicant: King Fahd University of Petroleum and Minerals, Dhahran (SA)

(72) Inventors: Abdelhafid Bouhraoua, Dhahran (SA); Nesar Merah, Dhahran (SA); Jaseem Al-Muaybid, Qatif (SA); Abduljabar Al Sayoud, Qatif (SA); Ayman Al-Darweesh, Qatif (SA); Jawad J. Al-Dawoud, Qatif (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/010,762

(22) Filed: Aug. 27, 2013

(65) Prior Publication Data
US 2013/0341106 A1    Dec. 26, 2013

Related U.S. Application Data

(62) Division of application No. 13/785,823, filed on Mar. 5, 2013, now Pat. No. 8,596,388, which is a division of application No. 12/987,855, filed on Jan. 10, 2011, now Pat. No. 8,418,787.

(51) Int. Cl.
*B62D 61/12* (2006.01)

(52) U.S. Cl.
USPC ....... 180/8.3; 180/8.2; 180/24.02; 280/149.2; 280/81.1

(58) Field of Classification Search
USPC .............. 180/8.1, 8.2, 8.3, 7.1, 8.5, 264, 265, 180/267, 24.02; 280/149.2, 87.042, 81.1
See application file for complete search history.

(56) References Cited

U.S. PATENT DOCUMENTS

| | | | |
|---|---|---|---|
| 3,438,641 A | 4/1969 | Bradley | |
| 4,569,409 A | 2/1986 | Kluth | |
| 4,790,548 A | 12/1988 | Decelles et al. | |
| 5,199,524 A * | 4/1993 | Ivancic | 180/237 |
| 5,513,865 A * | 5/1996 | Brooks et al. | 280/87.042 |
| 5,676,215 A | 10/1997 | Misawa | |
| 5,701,965 A | 12/1997 | Kamen et al. | |
| 5,833,248 A | 11/1998 | Eguchi | |
| 6,050,357 A * | 4/2000 | Staelin et al. | 180/65.1 |
| 6,341,784 B1 | 1/2002 | Carstens | |
| 6,484,829 B1 | 11/2002 | Cox | |

(Continued)

FOREIGN PATENT DOCUMENTS

| | | | | |
|---|---|---|---|---|
| GB | 2201926 A | 9/1988 | | B60G 23/00 |
| JP | 02003577 A | 1/1990 | | B62D 57/024 |
| WO | WO 01/53137 | 7/2001 | | |
| WO | WO 2008090508 A1 | 7/2008 | | A61G 5/06 |

*Primary Examiner* — Kevin Hurley
(74) *Attorney, Agent, or Firm* — Richard C. Litman

(57) ABSTRACT

The stair-climbing apparatus has a series of articulating wheel sets extending below the platform. All of the wheel sets are vertically adjustable to negotiate stairways and similar changes of elevation. The lead wheel set is fixed longitudinally relative to the platform, while following wheel sets are longitudinally adjustable to adjust for the pitch or slope of different stairways. The apparatus uses sensors (e.g., mechanical, infrared, ultrasonic, etc.) to detect the presence of the stair risers and their height, control of the assembly being accomplished by a control circuit on board the machine. The wheel sets are raised and lowered independently of one another by pantograph mechanisms extending between the platform and the wheel sets. The horizontally adjustable wheel sets are positioned by a longitudinally disposed rack on the platform.

6 Claims, 16 Drawing Sheets

(56) References Cited

U.S. PATENT DOCUMENTS

| | | |
|---|---|---|
| 6,615,938 B2 | 9/2003 | Morrell et al. |
| 7,216,876 B2 * | 5/2007 | Cole et al. .................. 280/43.23 |
| 7,246,671 B2 | 7/2007 | Goren et al. |
| 7,261,305 B2 * | 8/2007 | Cole ........................ 280/87.042 |
| 7,424,923 B2 | 9/2008 | Yang et al. |
| 8,550,480 B1 * | 10/2013 | Bonilla .................... 280/87.042 |
| 2003/0127259 A1 | 7/2003 | Logstrup |
| 2006/0151218 A1 * | 7/2006 | Goren et al. ............... 180/24.02 |

* cited by examiner

STAIR-CLIMBING APPARATUS

CROSS-REFERENCE TO RELATED APPLICATIONS

This is a divisional application of my prior application Ser. No. 13/785,823 filed Mar. 5, 2013, now pending, which is a divisional application of my prior application Ser. No. 12/987,855, filed Jan. 10, 2011, now U.S. Pat. No. 8,418,787.

BACKGROUND OF THE INVENTION

1. Field of the Invention

The present invention relates generally to powered devices for ascending and descending elevations, and particularly to a stair-climbing apparatus capable of free operation (i.e., not secured to another structure) on a flight of stairs or the like.

2. Description of the Related Art

The need for powered mechanical assistance for persons that have occasion to ascend or descend elevations has been known for a considerable period of time. This is particularly true for the elderly or infirm who have need to travel between floors of a multiple story building. The need also arises when transporting large and/or heavy articles between floors in a multiple story building, e.g., large office machines, such as console copiers, office or other furniture, etc.

Accordingly, elevators were developed well over one hundred years ago, and escalators were developed somewhat later. However, elevators and escalators require that the building structure provide for such devices, or the building structure must be modified extensively after completion in order to accommodate such lift devices.

As a result, various devices have been developed in the past for negotiating stairways and the like. Some of these devices are permanently installed along or on stairways to travel up and down the stairway. Often, these permanently installed machines also required modification of the building structure for their installation. Still other portable devices have been developed as well. Most, if not all, such devices require that the stairs have a constant pitch or slope in order for the device to function. If the stairs have a different pitch or slope between landings or between stories, most such devices are incapable of proceeding beyond the first flight of stairs.

Thus, a stair-climbing apparatus solving the aforementioned problems is desired.

SUMMARY OF THE INVENTION

The stair-climbing apparatus includes a wheeled undercarriage having a platform and three sets of vertically adjustable wheel pairs extending below the platform. Two of the three sets are also horizontally adjustable beneath the platform. The apparatus uses conventional electrical power to drive the wheels in order to advance the device to and onto the stairs. The various wheel pairs adjust vertically so that the platform remains horizontal at all times, the wheel pairs adjusting sequentially as required to negotiate the stairs. While the leading wheel pair or assembly is fixed at the forward end of the apparatus, i.e., it has no horizontal adjustment relative to the platform, the other two wheel pairs adjust forward and rearward beneath the platform in order to adjust for the difference in height between individual steps and to adjust for different pitches or slopes of stairways. The horizontal and vertical adjustment of the wheel pairs beneath the platform is controlled by proximity sensors, which detect the risers of the stair treads and adjust the wheel pairs accordingly. The proximity sensors may be of any conventional type, e.g., mechanical, infrared, ultrasonic, etc. A microcomputer or microcontroller receives the proximity signals and commands vertical and/or horizontal adjustment of the wheel pairs accordingly.

Vertical adjustment of the three sets of wheels is accomplished by a pantograph mechanism for each wheel set. Horizontal adjustment of the second and third wheel sets is accomplished by a track mechanism extending along the length of the platform, each of the second and third wheel sets having its own independent drive for horizontal adjustment. The wheels are provided with conventional electric or other drive means and brake means. The drive means may also serve as the brake means, depending upon the mechanism(s) incorporated.

These and other features of the present invention will become readily apparent upon further review of the following specification and drawings.

DETAILED DESCRIPTION OF THE PREFERRED EMBODIMENTS

The stair-climbing apparatus is a stand-alone machine, i.e., it has no attachment to the stairway structure upon which it operates, nor does the stairway structure require any modification(s) to accommodate the operation of the stair-climbing device. The apparatus is capable of negotiating stairways having different slopes and pitches of risers and treads, even along the same continuous stairway.

Figure 1A:
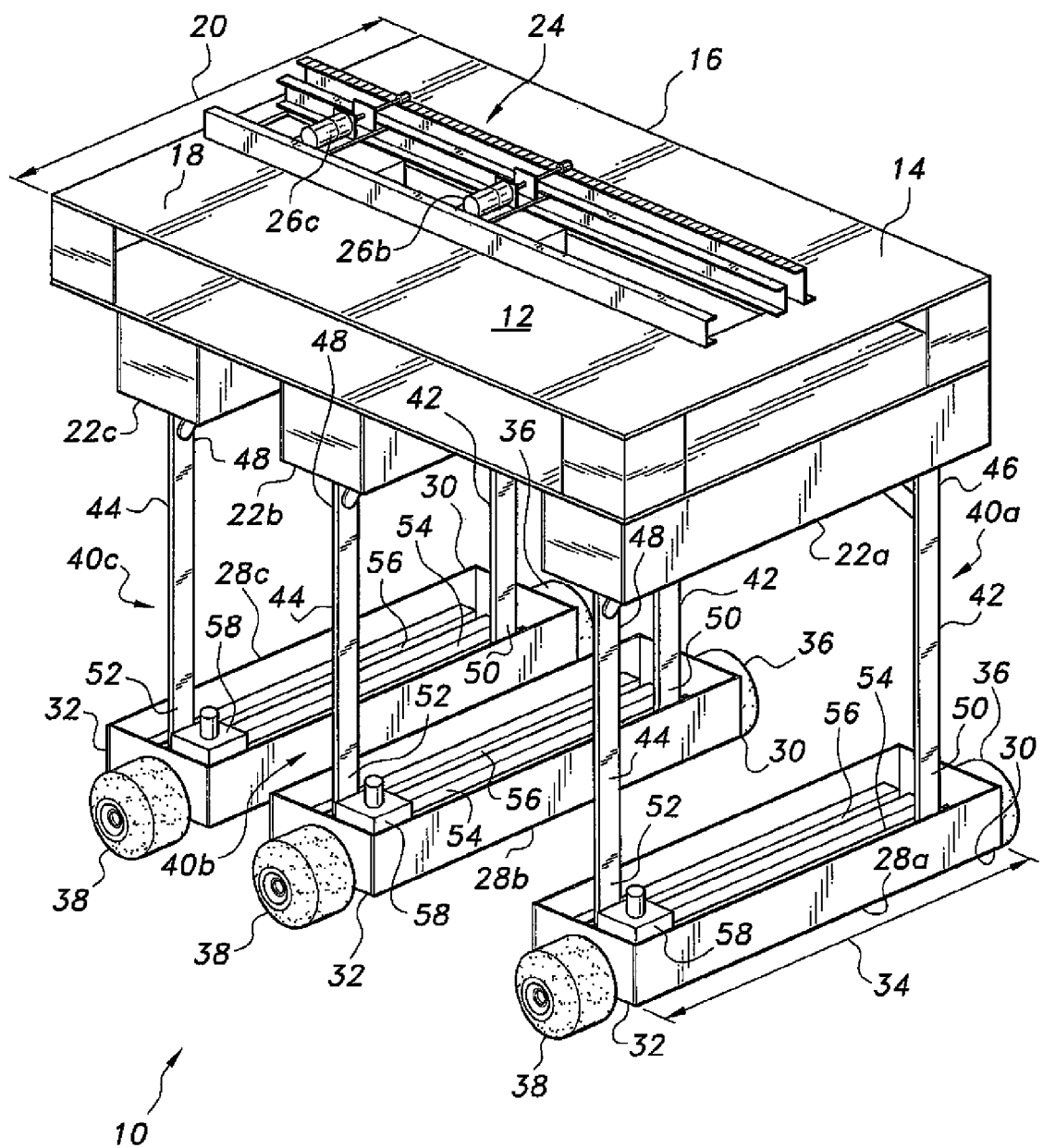
FIG. 1A is a perspective view of a stair-climbing apparatus according to the present invention, illustrating a first exemplary configuration.
Figure 1B:
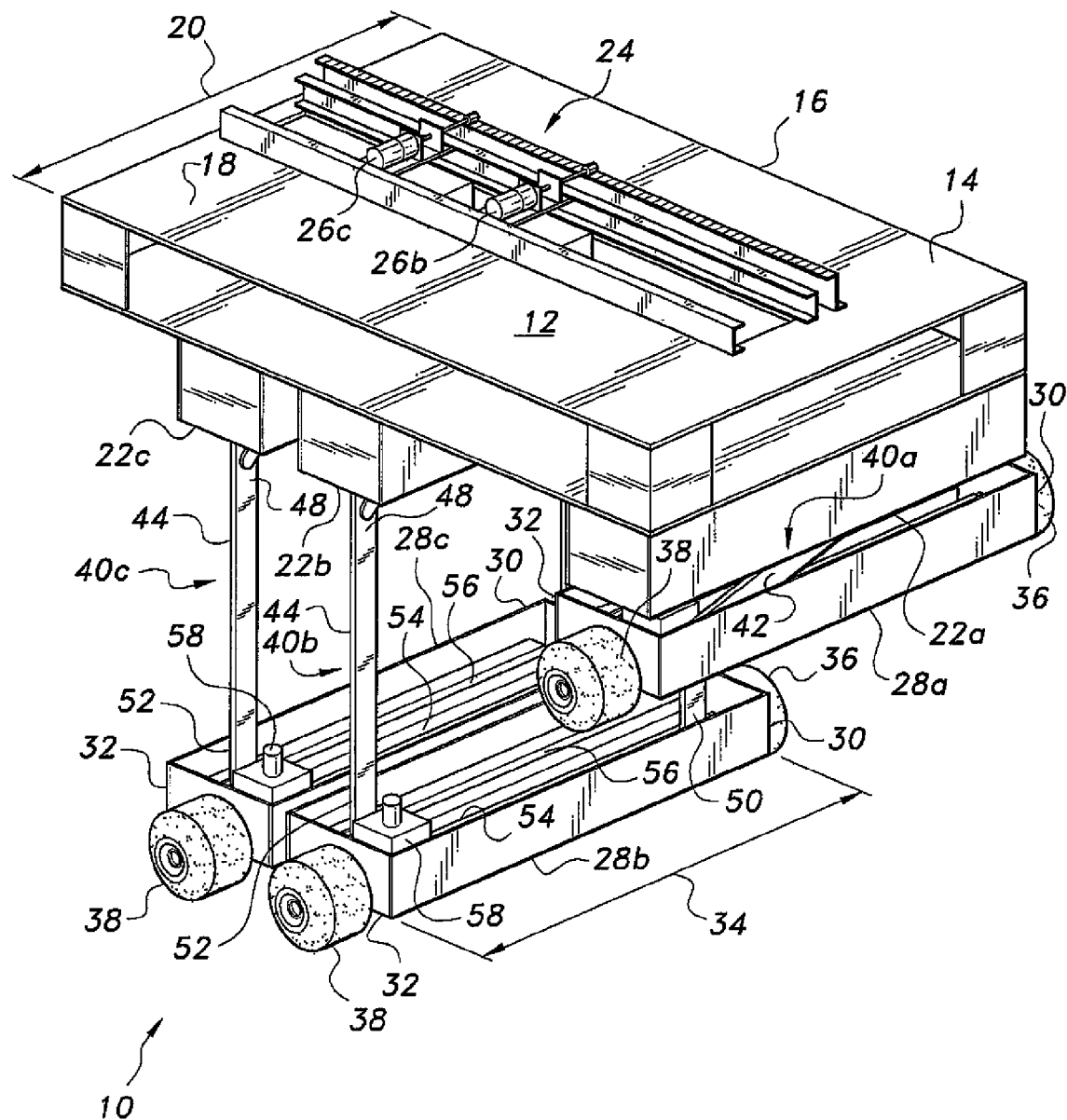
FIG. 1B is a perspective view of the stair-climbing apparatus of FIG. 1, illustrating an alternative configuration.

FIGS. 1A and 1B of the drawings provide perspective views of the stair-climbing apparatus 10. FIG. 1A illustrates the apparatus 10 with all of its wheel trucks extended, and FIG. 1B shows the exemplary retraction or raising of the first wheel truck and repositioning of the second end truck, as explained further below. The apparatus 10 comprises a platform 12 having a series of wheel carriages and wheel trucks adjustably extending below the platform. The carriages and trucks are controlled by appropriate conventional sensors and an on-board computerized system to adjust their positions as required to negotiate a flight of stairs.

The platform 12 has a first end 14, i.e., which is the leading end of the apparatus 10 when negotiating a flight of stairs, a medial portion 16, and an opposite second or trailing end portion 18. The platform 12 has a width 20 that is preferably somewhat narrower than a conventional stairway. A plurality of wheel carriages is installed directly beneath the platform 12. While any practicable number of such carriages may be provided, the three carriages 22a, 22b, and 22c of the exemplary stair-climbing apparatus 10 is considered to be optimum. However, it will be seen that additional carriages (and their wheel truck assemblies, discussed further below) may be provided by using the same mechanism as provided for the three carriages illustrated and described herein.

The first end wheel carriage 22a is immovably affixed beneath the platform 12, i.e., the first end carriage does not translate or move relative to the platform. However, the medial wheel carriage 22b and the second end portion wheel carriage 22c translate horizontally and longitudinally beneath the platform 12 when the apparatus 10 is in operation, as described further below. The longitudinal positioning of the two wheel carriages 22b and 22c is by means of an elongate rack 24 extending along the longitudinal axis of the platform 12 from a point near the first end 14 of the platform and a point on the second end portion 18 of the platform 12. The medial wheel carriage 22b has a medial drive mechanism 26b extending therefrom and engaging the rack 24, and the second end portion wheel carriage 22c has a substantially identical second end portion drive mechanism 26c engaging the rack 24. The drive mechanisms 26b and 26c may comprise electric motors affixed to extensions of the respective carriages, each motor driving a pinion that, in turn, engages a track extending along the rack 24. The rack 24 may also include guide rails to hold the drive mechanisms 26b, 26c and their respective wheel carriages 22b, 22c in proper alignment as they adjust longitudinally along the rack 24.

In FIG. 1A, it will be seen that the medial drive mechanism 26b, and thus its medial wheel carriage 22b, is positioned generally medially along the rack 24, and the second end portion drive mechanism 26c and its corresponding second end portion wheel carriage 22c is positioned near the extreme second or rearward end of the rack 24 and platform 12. In FIG. 1B, the central or medial drive mechanism 26b and its wheel carriage 22b are in the same positions as shown in FIG. 1A. However, the second end portion drive mechanism 26c has been actuated to move toward the opposite first end 14 of the platform 12, thus reducing the distance between the second end portion drive mechanism 26c and its carriage 22c and the medial drive mechanism 26b and its carriage 22b. The relative spacing between the wheel trucks and their wheels, discussed below, is adjusted accordingly.

Each of the wheel carriages 22a, 22b, and 22c has a wheel truck 28a, 28b, and 28c, respectively, adjustably extending beneath the corresponding carriage. The wheel trucks 28a through 28c are substantially identical to one another, each of the trucks 28a, 28,b, and 28c having a first end 30 and opposite second end 32 defining a span 34 substantially equal to the width 20 of the platform 12. A first wheel 36 extends from the first end 30 of each of the wheel trucks 28a through 28c, and a second wheel 38 extends from the opposite second end 32 of each truck. The wheels 36 and 38 are driven by conventional means, i.e., electric motors powered by an on-board electrical storage battery, the drive motors being contained in their respective wheel trucks or in the hubs of the wheels. Such drive means is well known and conventional, and may be incorporated into the stair-climbing apparatus 10.

Each of the wheel trucks is adjusted vertically relative to the platform 12 by a corresponding pantograph linkage 40a, 40b, and 40c extending between the wheel truck and its corresponding wheel carriage. The three pantograph linkages 40a, 40b, and 40c are substantially identical to one another. Each linkage 40a, 40b, 40c comprises a first arm 42 and a laterally opposite second arm 44, each of the arms 42, 44 having an upper or wheel carriage attachment end 46, 48 and an opposite lower or wheel truck attachment end 50, 52. The upper ends 46, 48 of the two arms 42, 44 are pivotally attached to the corresponding lateral ends of their respective wheel carriages 22a through 22c, and the opposite lower ends 50, 52 of the arms 42, 44 translate laterally along the corresponding wheel truck 28a through 28c.

Each wheel truck 28a through 28c has a first track 54 and a parallel second track 56 extending laterally across the truck. The lower end 50 of the first arm 42 travels laterally along the first track 54, and the lower end 52 of the opposite second arm 44 travels laterally along the second track 56 in each wheel truck 28a through 28c. The lower ends 50, 52 of the two arms 42, 44 travel in opposite directions to one another and towards the respective opposite ends 32 and 30 of each wheel truck 28a through 28c as the wheel truck is lowered relative to the platform 12. The lower ends 50, 52 of the two arms 42, 44 cross or pass one another at the midpoints of their respective tracks 54 and 56, when the respective wheel truck has been raised somewhat from its fully extended position, as shown with respect to the wheel carriage 22a at the lead end 14 of the apparatus 10 in FIG. 1B. The drive for this articulating arm system is accomplished by a motor 58 located on or in each wheel truck 28a through 28c. The drive system may comprise conventional roller chains, toothed belts, worm drives, etc., as desired.

Figure 3:
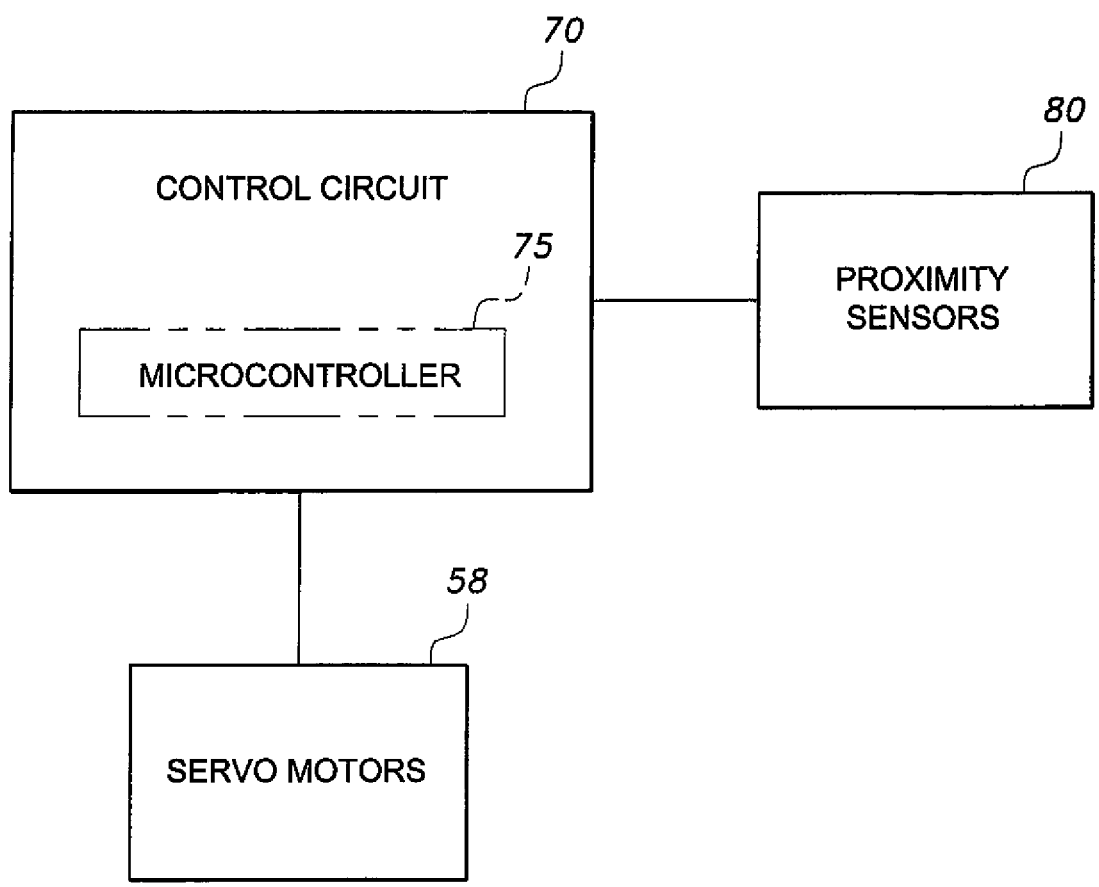
FIG. 3 is a block diagram of an exemplary control circuit for a stair-climbing apparatus according to the present invention Similar reference characters denote corresponding features consistently throughout the attached drawings.

FIG. 3 is a block diagram of an exemplary control circuit for the stair-climbing apparatus 10. The stair-climbing apparatus 10 includes proximity sensors 80 to sense when the apparatus approaches stair treads. The proximity sensors 80 also may also have the capability to sense the height of the stair risers, or the height sensors may be discrete devices that are generically included within the term "proximity sensors" in the present application. Such sensors are well known in the field of robotics. The apparatus 10 includes a control circuit 70 having a microcontroller 75 or microprocessor programmed to receive signals from the proximity sensors 80 and raise or lower the wheel trucks 28a, 28b, and 28c or drive the wheels forward by control signals to the motors 58, and to move the wheel carriages 22b and 22c translationally forward and rearward by control signals to the drive mechanisms 26b and 26c. Again, such control circuits 70 are well own in the robotics art and need not be described further.

Figure 2A:
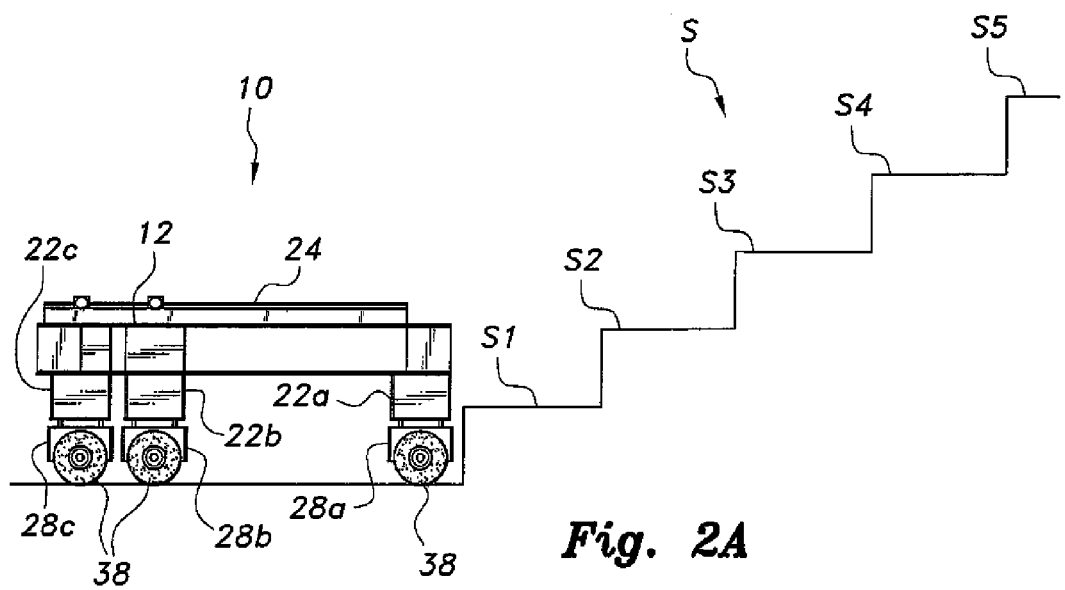
FIGS. 2A, 2B, 2C, 2D, 2E, 2F, 2G, 2H, 2I, 2J, 2K, 2L, 2M, 2N, 2O, 2P, 2Q, 2R, 2S, 2T, 2U, 2V, 2W, 2X, 2Y and 2Z are right side elevation views illustrating successive steps in the process involved as the stair-climbing apparatus of FIG. 1A ascends a flight of steps or stairs.
Figure 2B:
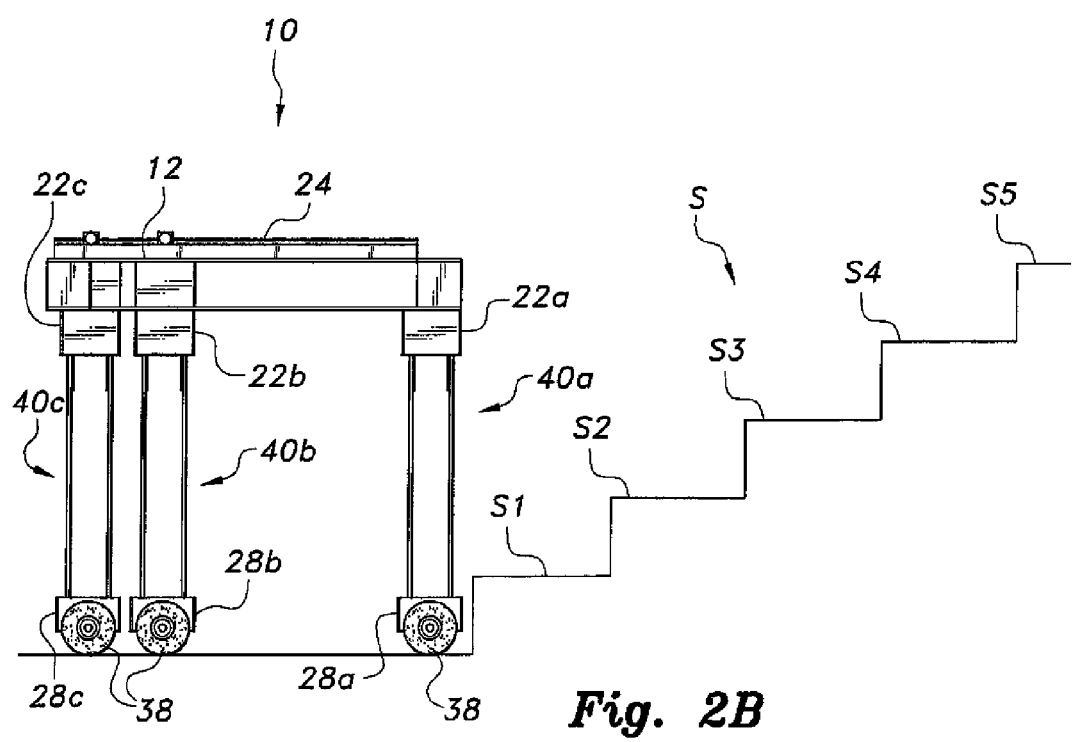
Figure 2C:
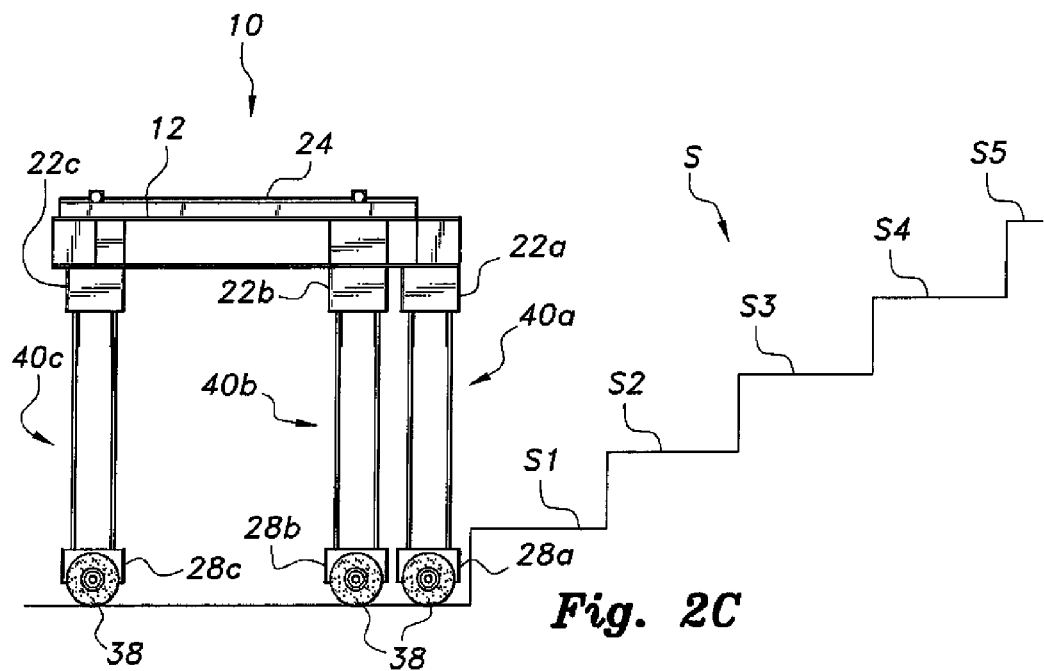
Figure 2D:
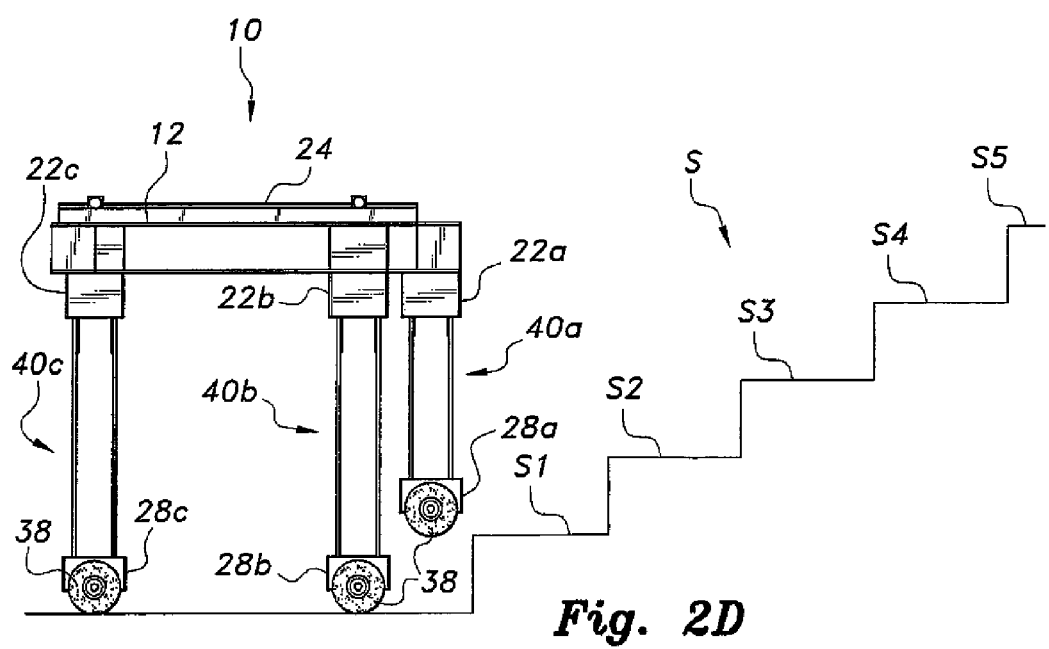
Figure 2E:
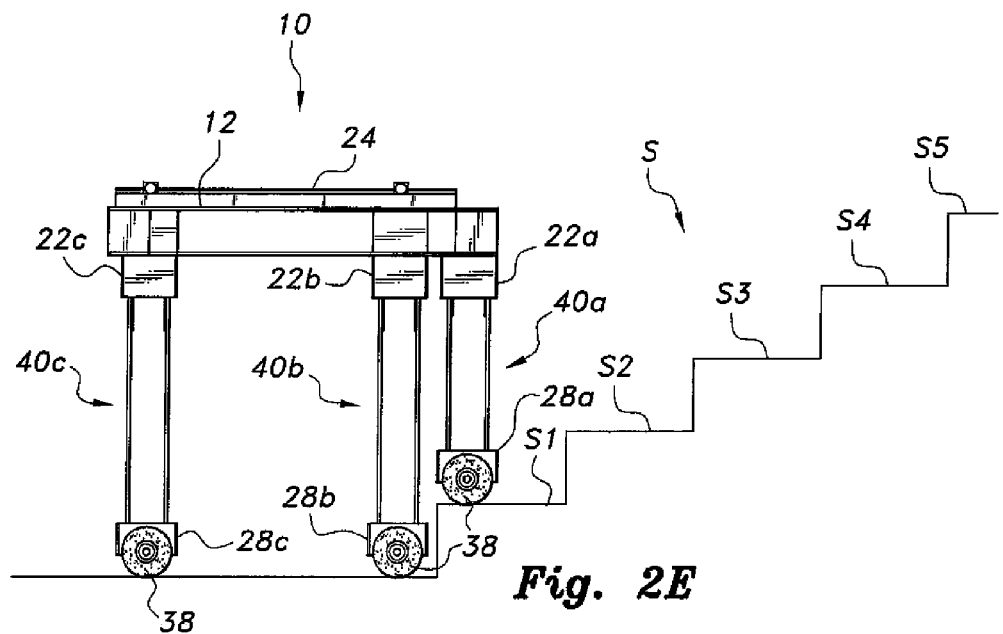
Figure 2F:
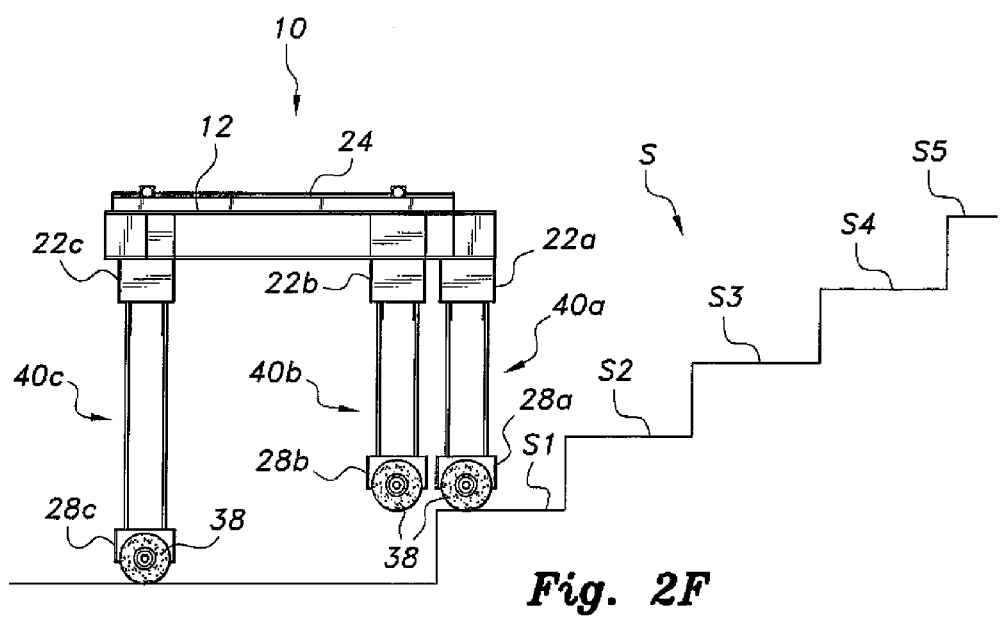
Figure 2G:
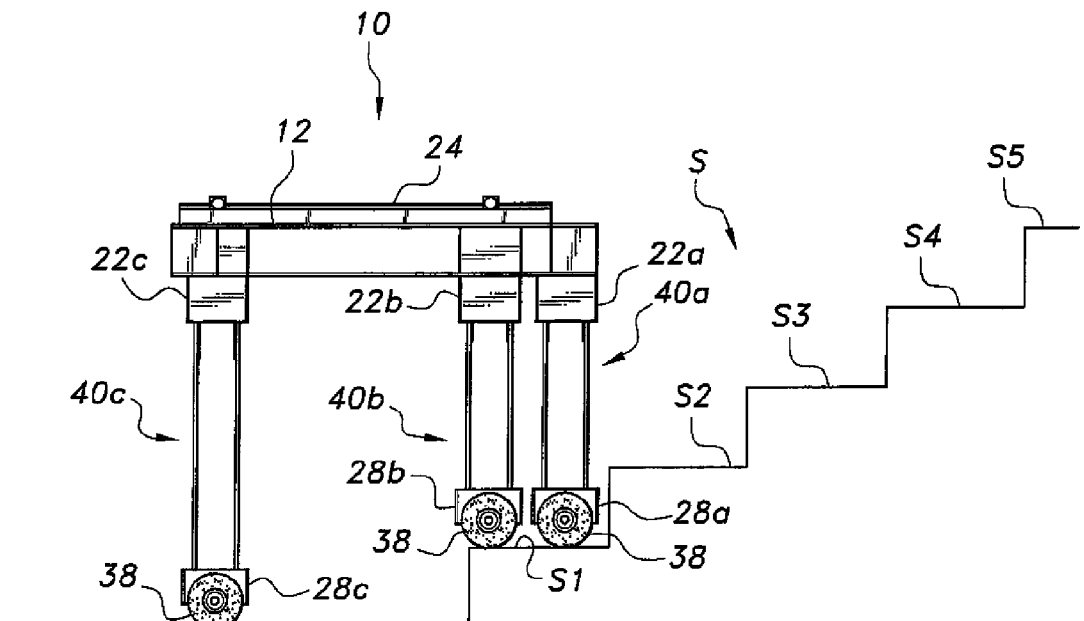
Figure 2H:
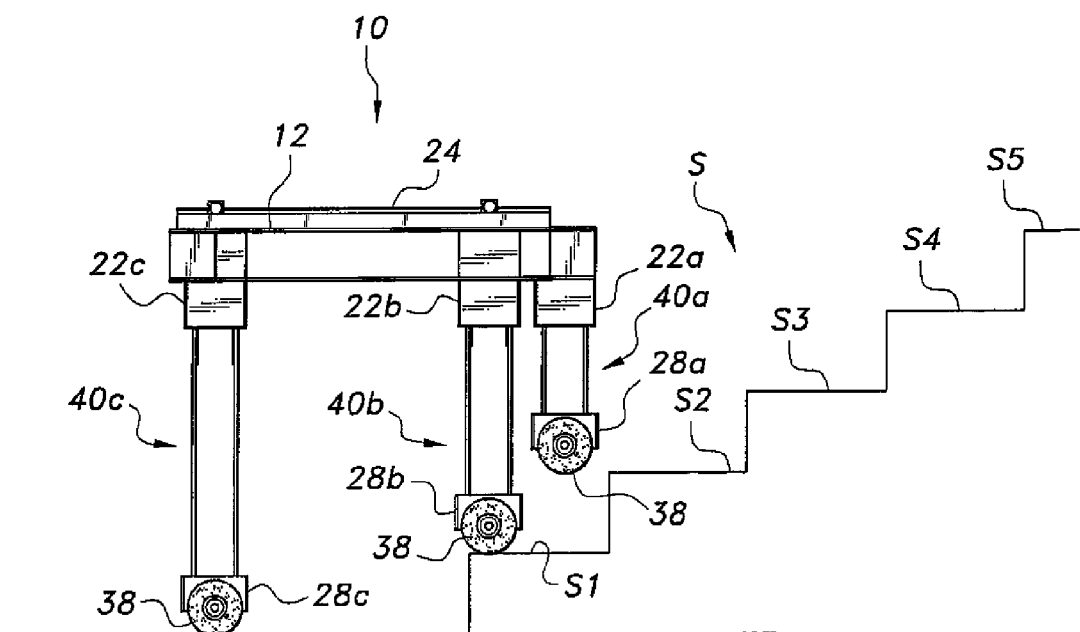
Figure 2I:
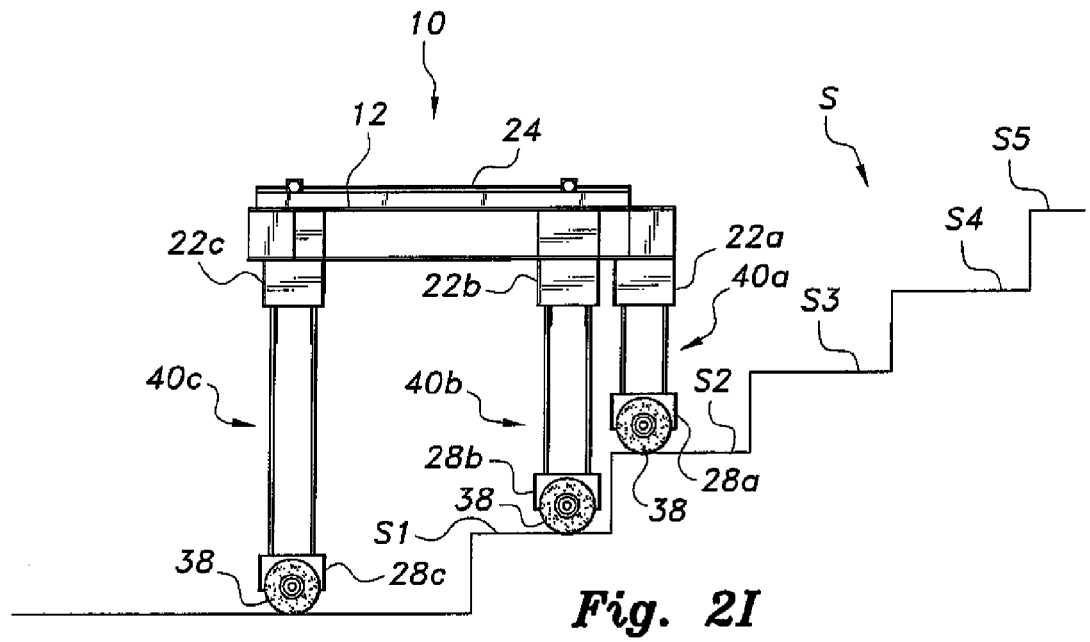
Figure 2J:
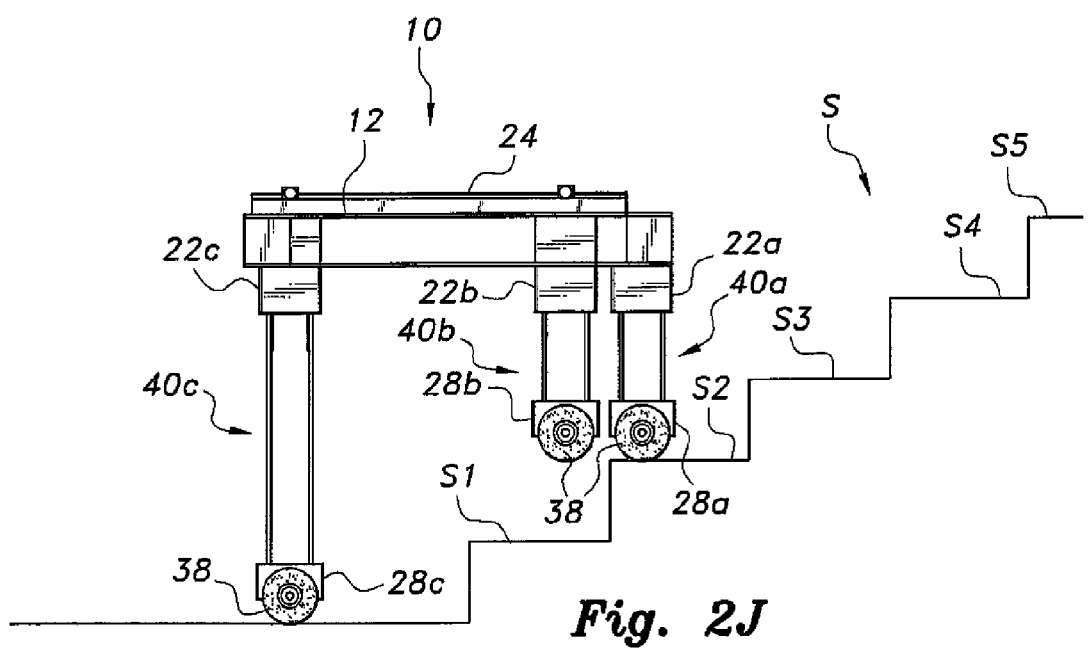
Figure 2K:
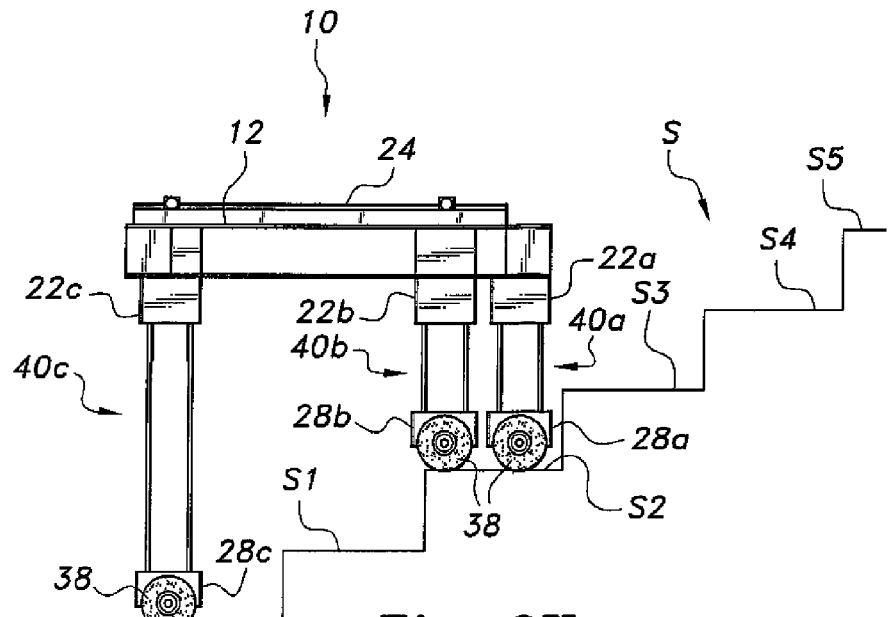
Figure 2L:
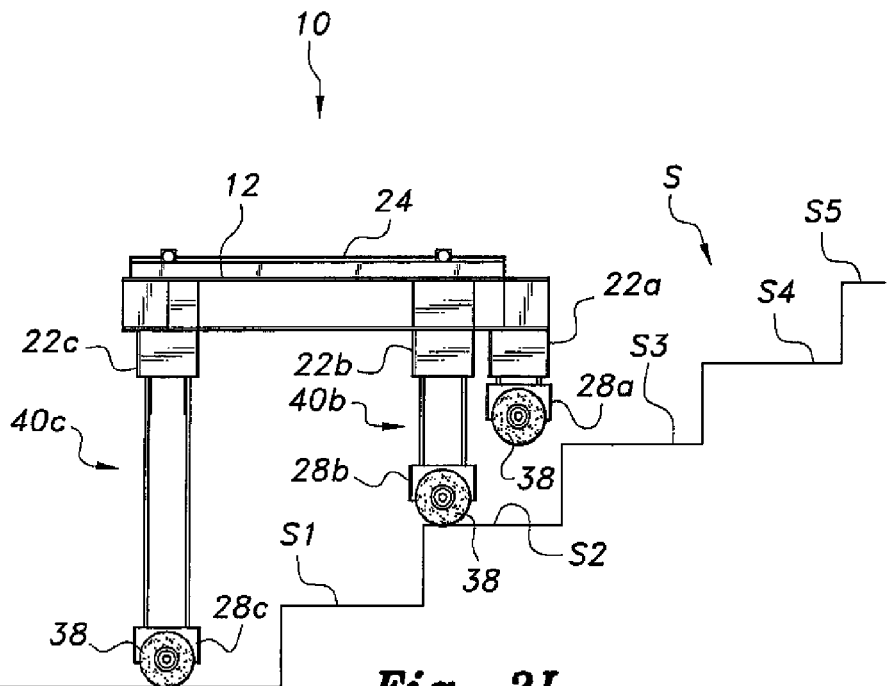
Figure 2M:
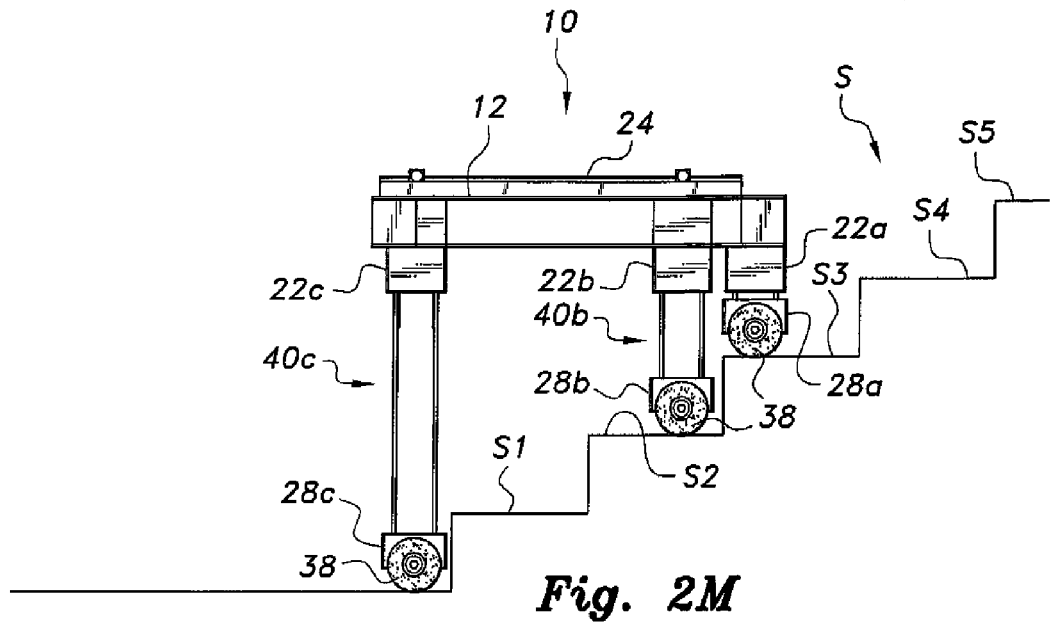
Figure 2N:
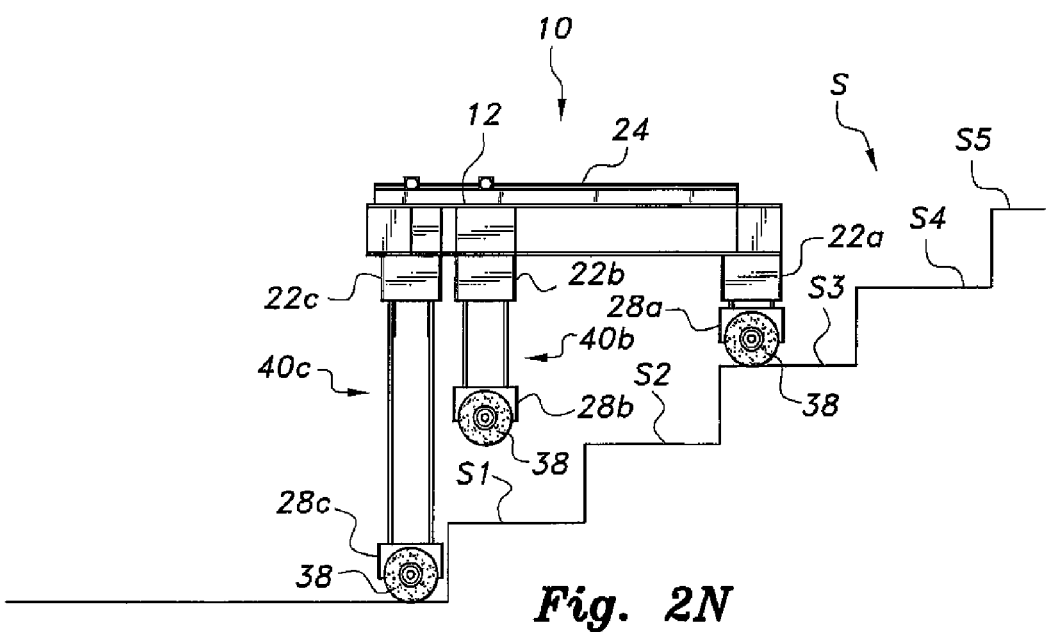
Figure 2O:
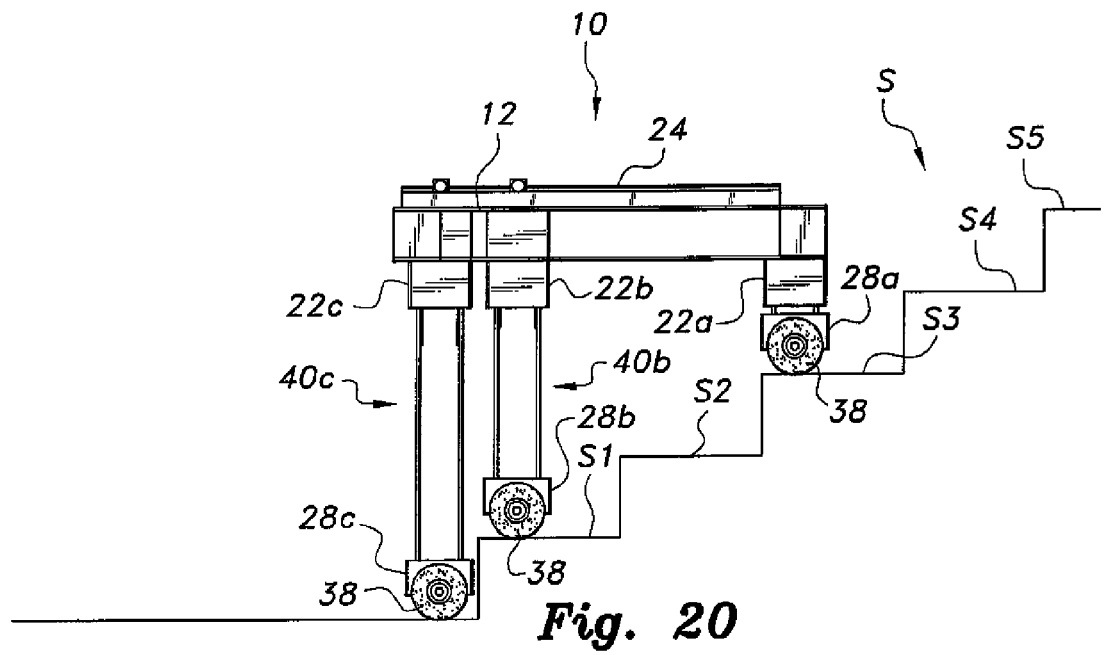
Figure 2P:
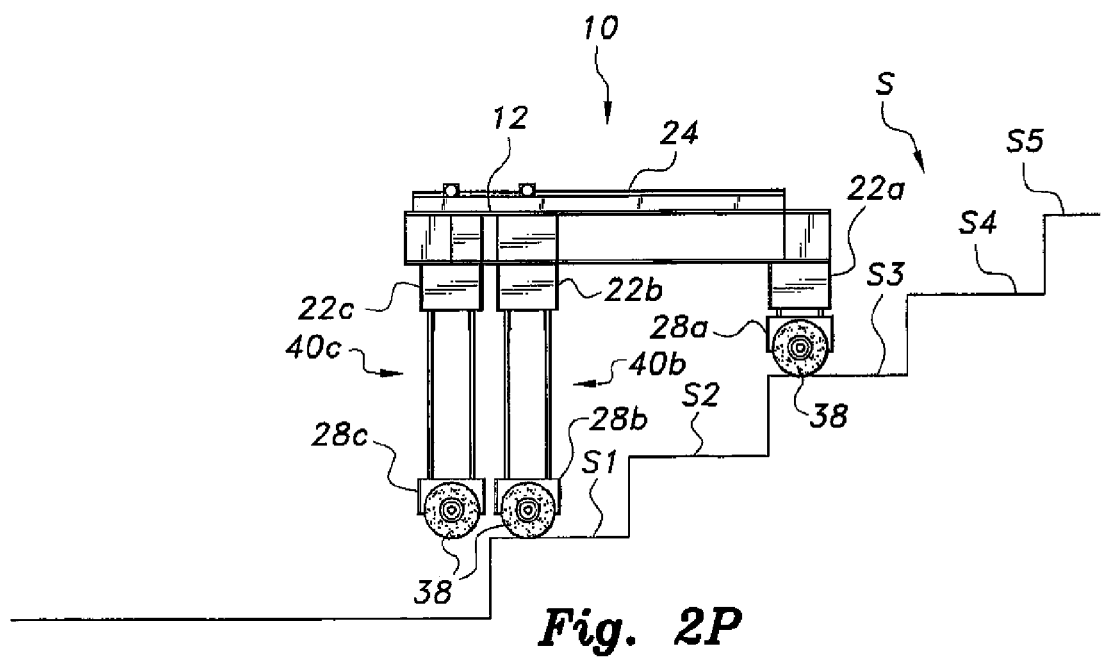
Figure 2Q:
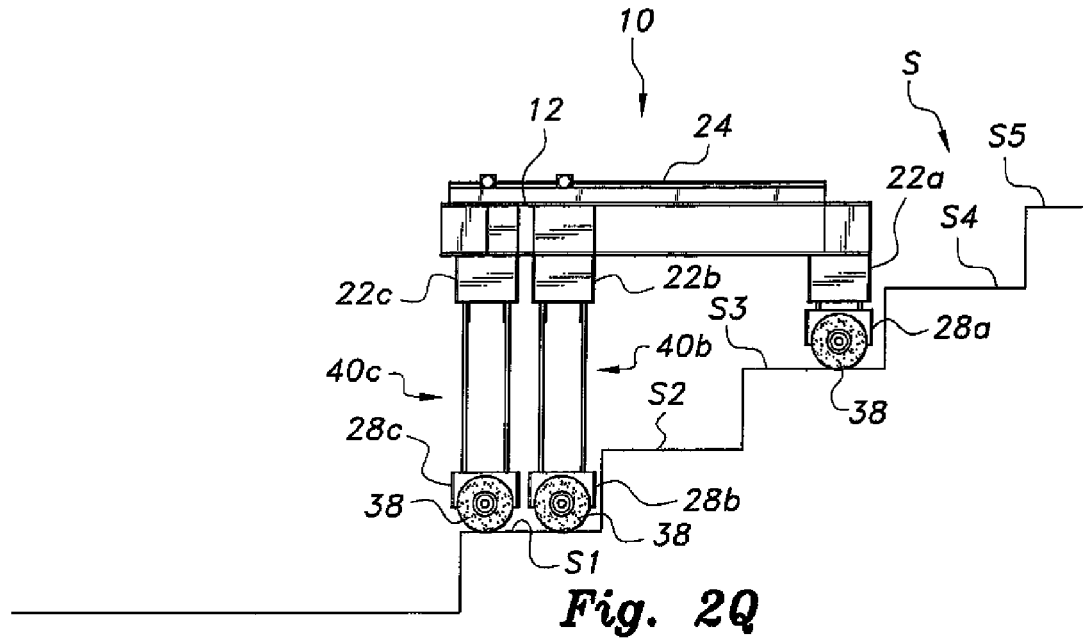
Figure 2R:
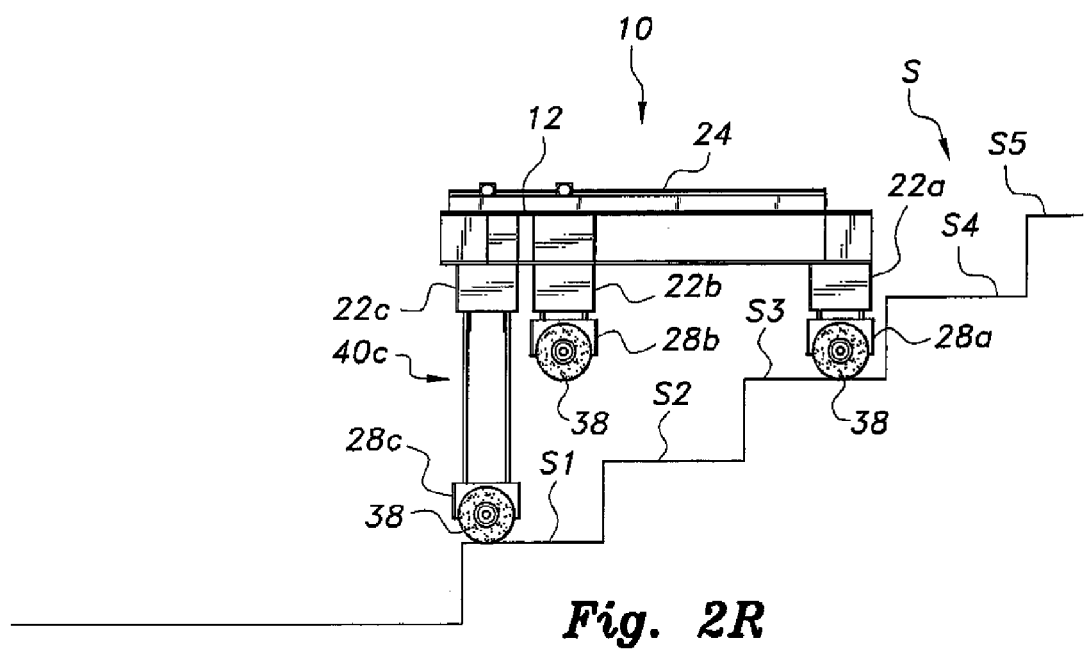
Figure 2S:
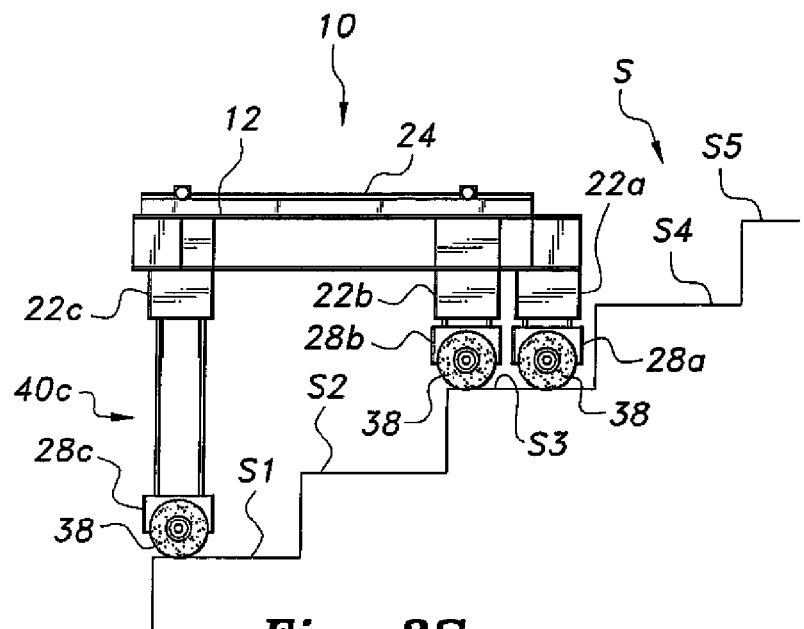
Figure 2T:
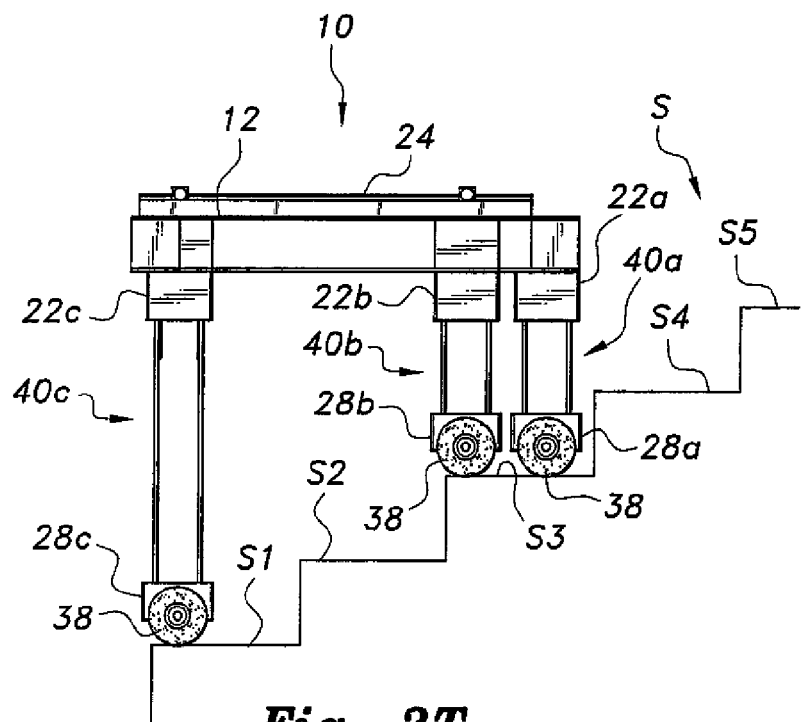
Figure 2U:
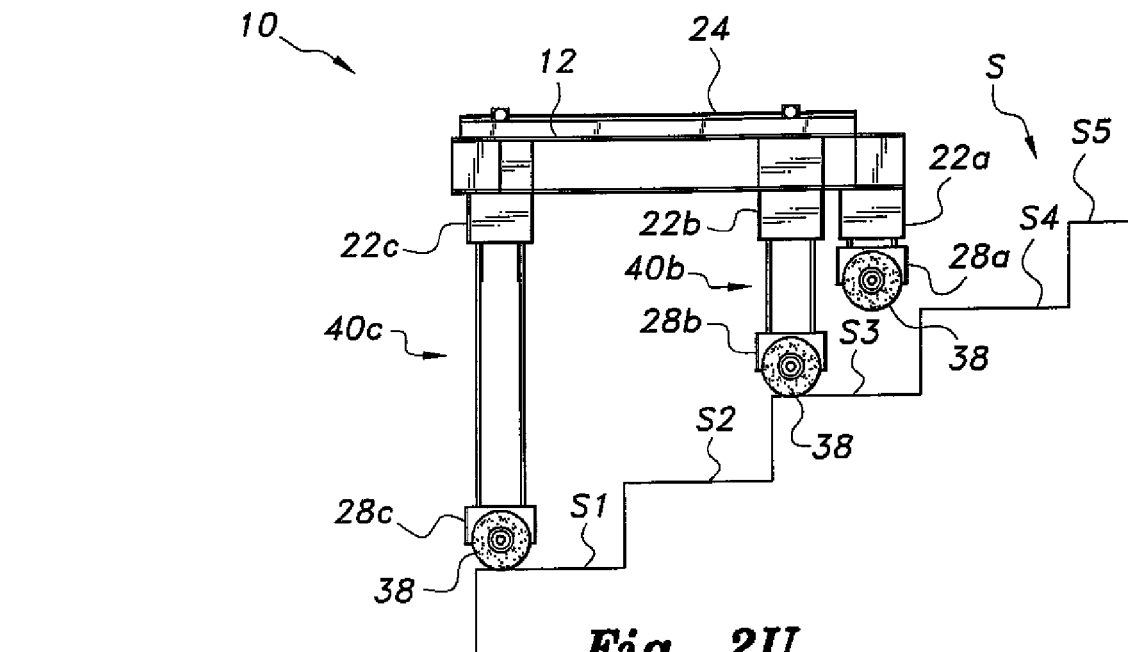
Figure 2V:
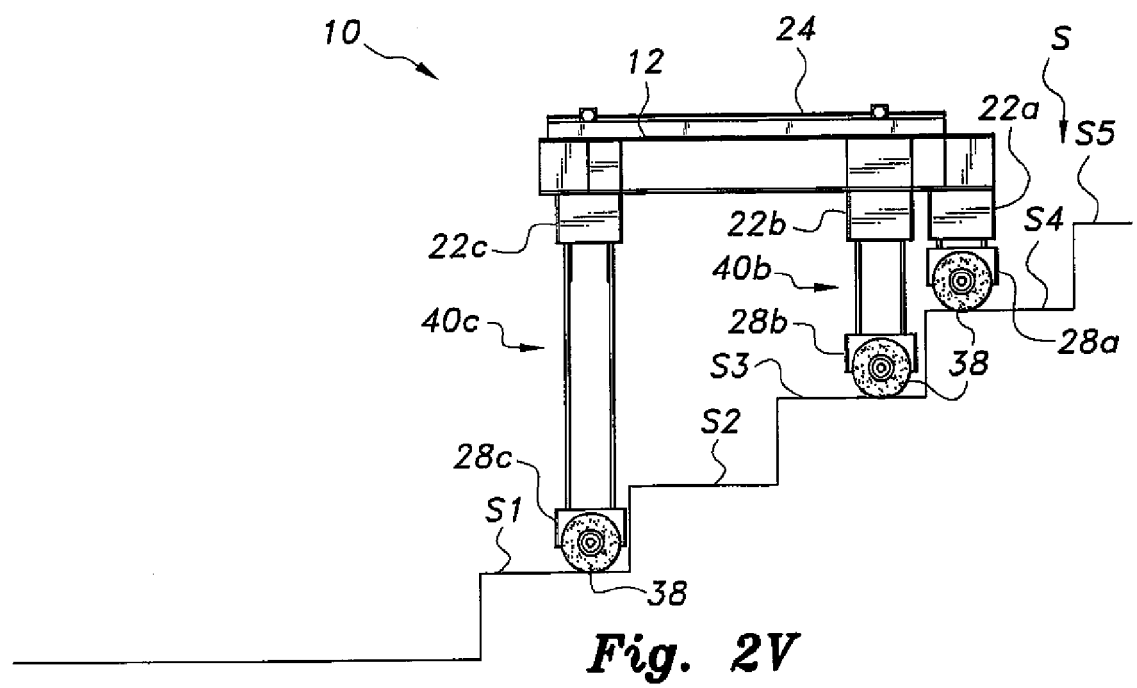
Figure 2W:
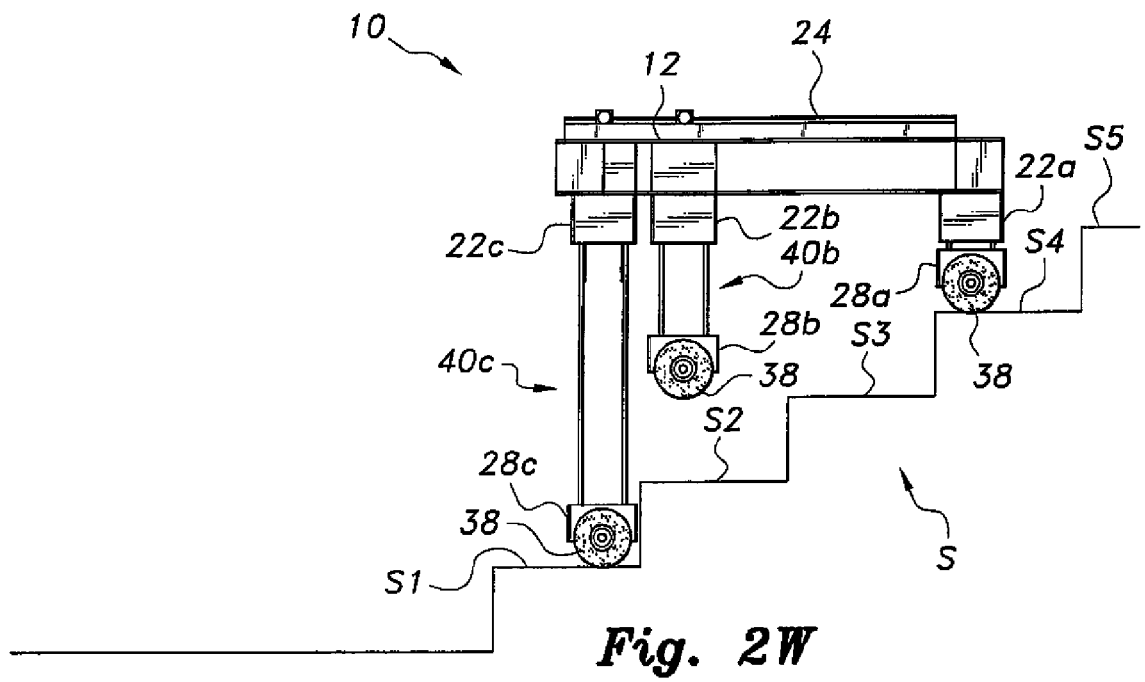
Figure 2X:
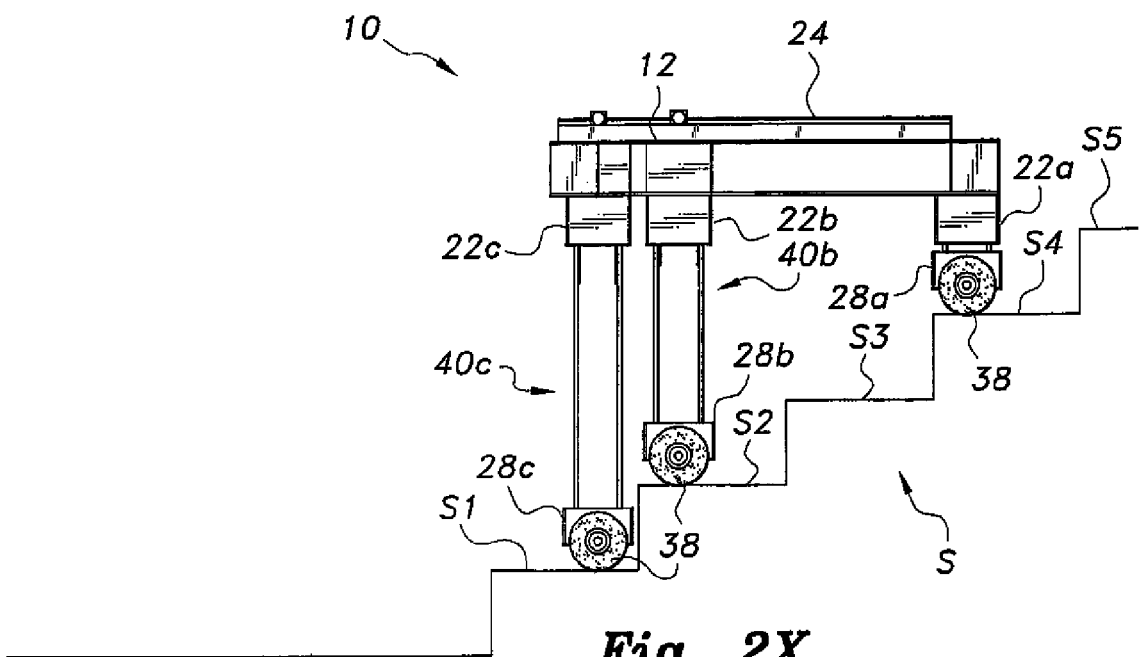
Figure 2Y:
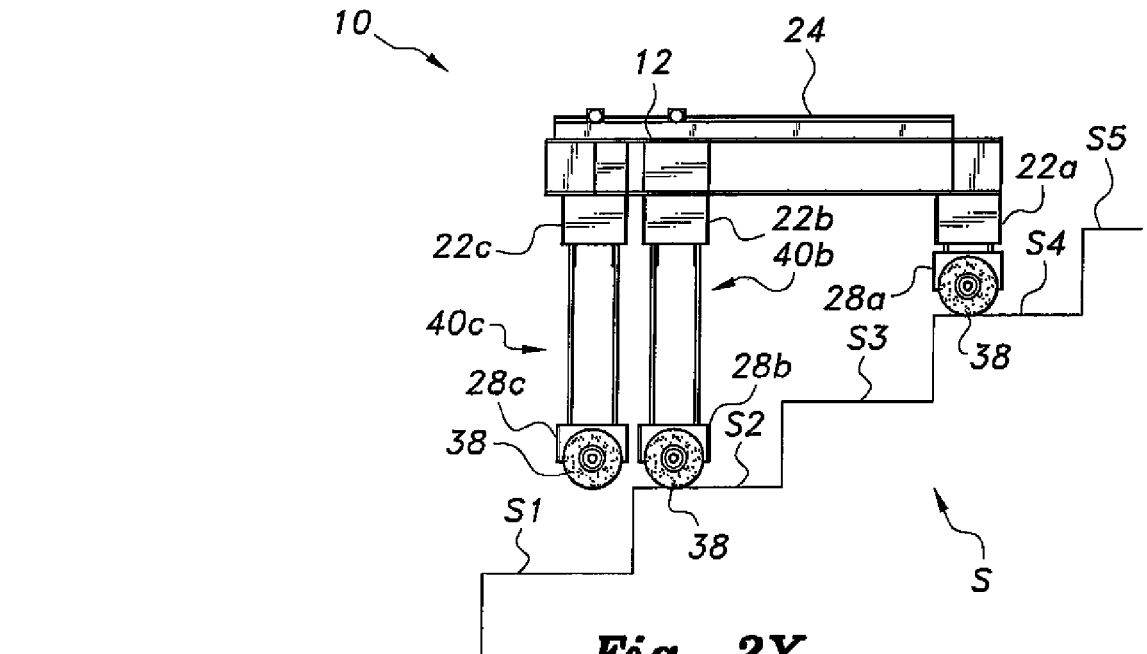
Figure 2Z:
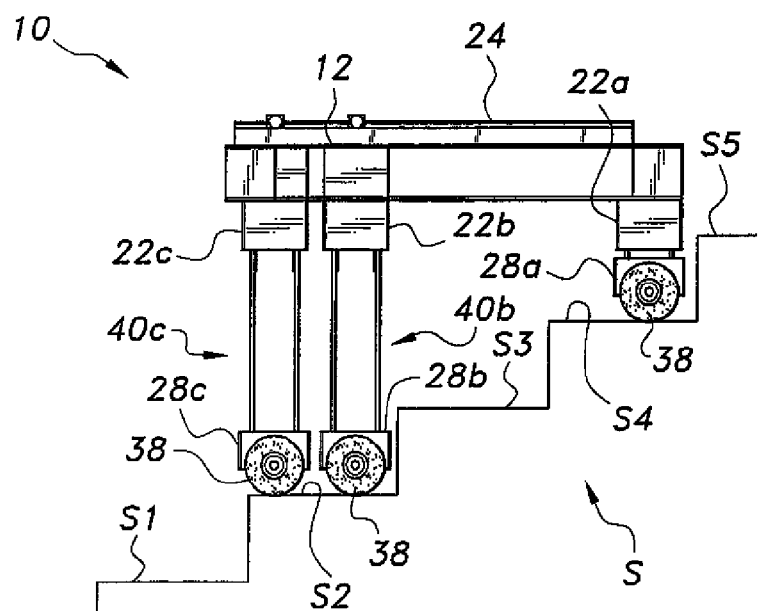

FIGS. 2A through 2Z are schematic side elevation views showing a progression of operations of the apparatus 10 as it negotiates a flight of steps or stairs. In FIG. 2A, the apparatus 10 is shown in its completely collapsed configuration, i.e., all of the support arms of the pantograph assemblies or linkages 40a, 40b, and 40c (shown in varying states of extension and retraction in FIGS. 2B through 2Z) have been retracted to lower the platform 12 to its lowest state. The pantograph assemblies 40a, 40b, and 40c do not need to be fully collapsed as the device is still approaching the first step S1 of the stairway S, but complete retraction of all of the pantograph linkages provides more compact storage and a lower center of gravity for the device.

The riser of the first step S1 is sensed by on-board detection means, e.g., infrared or other electromagnetic frequency means, ultrasonic detection, mechanical sensors, etc. The stair-climbing apparatus 10 includes means for detecting both horizontal proximity and the height of the risers of the stair steps. Such sensors are well known in the art, and need not be described further. As the first riser is sensed, the on-board computer or microcontroller system actuates the three pantograph linkage drive motors 58 of the three wheel trucks 28a, 28b, and 28c, causing the linkages 40a, 40b, and 40c to extend generally as shown in FIG. 2B of the drawings.

It will be seen that the first wheel truck 28a cannot remain retracted or partially extended to clear the height of the riser of the first step S1, as the only support for the apparatus 10 would be by means of the two rearwardly located wheel trucks 28b and 28c, which would cause the device to tip forward. Accordingly, the second wheel truck 28b is translated forward by moving its wheel carriage 22b forward along the rack 24. The resulting configuration is generally as shown in FIG. 2C.

Once this has been accomplished, the first or forward wheel truck 28a may be raised to clear the riser of the first step S1, generally as shown in FIG. 2D. The apparatus 10 then senses that the forward truck 28a is no longer blocked by close proximity of the riser of the first step S1, and actuates the drive wheels 38 of the medial and/or second end wheel trucks 28b and 28c to move the apparatus 10 forward, thereby placing the wheels 38 of the first wheel truck 28a atop the tread of the first step S1, as shown in FIG. 2E.

At this point, the on-board sensor system senses the proximity of the riser of the first step S1 immediately in front of the second or medial wheel truck 28b, and directs the medial pantograph linkage 40b to lift the medial wheel truck 28b to the level of the first end wheel truck 28a to clear the riser of the first step S, generally as shown in FIG. 2F. Once this has been accomplished, the system applies motive power to the wheels of the first end and/or second end wheel trucks 28a and 28c (the wheels of the intermediate truck 28b are not in contact with a surface at this point) to drive the apparatus 10 forward, thereby placing the wheels of both the first end truck and medial truck 28a and 28b atop the first step S1, generally as shown in FIG. 2G of the drawings.

When this has been accomplished, the first end wheel truck 28a is again lifted by actuating its pantograph mechanism 40a in readiness for placement of its wheels atop the second step S2, generally as shown in FIG. 2H. The apparatus 10 is once again driven forward, i.e., in the direction of the rising stairway S, resulting in the wheels of the first end truck 28a resting atop the second step S2 and the wheels of the medial truck 28b resting atop the first step S1 adjacent the second step riser, generally as shown in FIG. 2I of the drawings.

It will be noted that at this point there is sufficient horizontal room for the first wheel truck 28a to advance until it reaches the riser of the third step S3. However, the medial wheel truck 28b is abutting the riser of the second step S2, so no further forward progress may be made until the medial wheel truck 28b is lifted. This is shown in FIG. 2J of the drawings. Once this has been accomplished the apparatus 10 is once more driven forward until the wheels of both the first end wheel truck 28a and the medial wheel truck 28b are resting atop the second step S2, generally as shown in FIG. 2K.

This general process is repeated, as shown in FIGS. 2L and 2M, so that the first end wheel truck 28a is raised in preparation for placement atop the third step S3 (FIG. 2L), and the apparatus is driven forward to place the wheels of the first end wheel truck 28a atop the third step S3 while the medial wheel truck 28b abuts the riser of the third step S3. However, at this point it will be noted that the second end wheel truck 28c is abutting the riser of the first step S1. Thus, the stair-climbing apparatus 10 cannot advance further up the stairway S, regardless of the height of the medial wheels and wheel truck 28b. Should the pitch or slope of the stairway S be somewhat different than that illustrated, the operating system of the apparatus 10 can adjust the fore and aft position of the second end portion wheel carriage 22c, and thus the fore and aft position of the second end portion wheel truck 28c as required.

When the above procedure has been carried out as necessary, the medial wheel truck 28b is moved rearward by actuating its carriage drive 26b (shown in FIGS. 1A and 1B), as shown in FIG. 2N of the drawings. The medial pantograph linkage 40b is then extended to lower its medial wheel truck 28b, thereby once again placing the wheels of the medial truck 28b atop the first step S1 as shown in FIG. 2O of the drawings.

The rearward or second end support provided by repositioning the medial wheel truck 28b adjacent the second end portion truck 28c allows the second end truck 28c to be lifted as shown in FIG. 2P. At this point the apparatus 10 is driven forward once again, positioning the second end portion wheel truck 28c and its wheels atop the first step S1 immediately behind the medial wheel truck 28b, generally as shown in FIG. 2Q of the drawings.

The process continues by lifting the medial wheel truck 28b in preparation for translating it forwardly, as shown in FIG. 2R. It will be noted that due to the first end truck 28a and the second end truck 28c being separated in height by only two steps, it is not necessary to extend the second end pantograph linkage 40c to its full height. The first end pantograph is completely retracted at this point, as is the medial pantograph. This raises the medial wheel truck 28b and its wheels to the same elevation as the first or forward end wheel truck and wheels 28a to allow the medial truck 28b to move forward to rest upon the third step S3 immediately behind the first end truck 28a, as illustrated in FIG. 2S.

At this point, the apparatus 10 must lift the first end wheel truck 28a once again in preparation for placing it atop the fourth step S4. However, the pantograph linkages of the first end truck 28a and the medial wheel truck 28b are retracted to their maximum extent, i.e., the first end and medial trucks 28a and 28b are immediately adjacent their respective carriages 22a and 22b and cannot be raised further. Accordingly, all of the pantograph linkages 40a, 40b, and 40c are extended to provide sufficient room for the subsequent retraction of the first end wheel truck 28a, generally as shown in FIG. 2T, in preparation for another move forward up the steps S. (It will be seen that the control system may be programmed to hold the first or forward end wheel truck 28a in a completely retracted state rather than extending it as shown in FIG. 2T, if so desired. The medial wheel truck 28b and second end portion wheel truck 28c provide sufficient support at this point.) In any event, the coordinated extension and retraction of the various pantograph linkages 40a, 40b, and 40c as the apparatus 10 negotiates the stairway S assures that the platform 12 always remains level throughout the entire operation.

Once the platform 12 has been lifted, as shown in FIG. 2T, the first or forward end wheel truck 28a is lifted once again (if it was not held in its lifted state during the operation described above in the discussion of FIG. 2T) to clear the fourth step S4, as illustrated in FIG. 2U of the drawings. The proximity sensor system of the device determines that there is some distance between each of the wheel trucks 28a, 28b, and 28c and the corresponding risers of the steps S5, S4, and S2, and signals the drive means to move the apparatus 10 forward to the position shown in FIG. 2V of the drawings.

At this point, the medial wheel carriage 22b is translated rearward, i.e., toward the second end portion carriage 22c, to position it over the second step S2 as shown in FIG. 2W. The medial wheel truck 28b is then lowered by extending its pantograph linkage 40b to place the wheels 36 and 38 of the truck 28b at rest on the second step S2, as shown in FIG. 2X. This allows the rearward or second end portion wheel truck 28c to be raised to clear the riser of the second step S2, as shown in FIG. 2Y. The horizontal clearance between the first and medial wheel trucks 28a, 28b and the risers of the respective steps S5 and S3 allow the stair-climbing apparatus 10 to advance toward those steps and to position the second end portion wheel truck 28c on the second step S2, as shown in FIG. 2Z.

It will be seen that the above-described process may continue up the flight of stairs S to the extent necessary to reach the top of the stair or some other point along the stairway, as desired. The process would continue with the medial wheel truck 28a retracting and moving forward as shown in FIGS. 2R and 2S, the platform 12 then being raised, as shown in FIG. 2T. The process would continue generally as shown in FIGS. 2U through 2Z, repeating the operation illustrated in FIGS. 2R through 2Z as necessary until reaching the destination on the stairway S.

While the operation has been described above as being a series of finite, sequential steps, it will be seen that the control system may be programmed to actuate the various operations in a fairly rapid and fluid sequence, allowing the stair-climbing apparatus to move smoothly and reasonably rapidly up a flight of stairs. It should also be noted that while only a description of the sequential moves involved in traveling up a flight of stairs has been provided herein, it is but a trivial matter to reverse the operation to allow the apparatus to travel down such a flight of stairs.

It will be seen that while the present discussion is directed to the use of the device on a fixed, stationary stairway, the stair-climbing apparatus may also be adaptable for use on a moving escalator by appropriate programming of the control system to account for the movement of the escalator steps at the bottom and top of the escalator. Such operations will of course depend upon the capability of the device to make positional adjustments to the wheel trucks sufficiently rapidly to accommodate the lifting action of the escalator steps at the bottom of the escalator, and the leveling of the steps at the top.

The stair-climbing apparatus 10 may be adapted to carry or lift virtually any practicable article up (or down) a flight of stairs. The platform 12 may be equipped with cargo tiedowns to secure various pieces of equipment thereto, e.g., large, heavy, and/or bulky office equipment such as console copiers, desks, and the like, or large appliances such as refrigerators, air conditioning units, stoves, etc. In addition, it will be seen that appropriate means for securing a wheelchair or the like to the platform may be provided, allowing the physically handicapped to reach different floors or levels in a building structure where no other means is available to them.

It is to be understood that the present invention is not limited to the embodiment described above, but encompasses any and all embodiments within the scope of the following claims.

We claim:

1. A stair-climbing apparatus, comprising:
   a platform having a first end, a medial portion, and a second end portion opposite the first end, the platform defining a width;
   a plurality of wheel trucks adjustably disposed beneath the platform, each of the wheel trucks having a first end, a second end disposed laterally opposite the first end, and a span extending between the first and second ends, the span being substantially equal to the width of the platform;
   a first wheel extending from the first end of each of the wheel trucks;
   a second wheel extending from the second end of each of the wheel trucks;
   a first end wheel carriage immovably affixed beneath the first end of the platform;
   a medial wheel carriage disposed beneath the medial portion of the platform, the medial wheel carriage being horizontally positionable along the medial portion of the platform; and
   a second end portion wheel carriage disposed beneath the second end portion of the platform, the second end portion wheel carriage being horizontally positionable along the second end portion of the platform.

2. The stair-climbing apparatus according to claim 1, further including:
   an elongate rack extending between the first end of the platform and the second end portion of the platform;
   a medial drive mechanism extending from said medial wheel carriage, the medial drive mechanism being operably connected to the rack and selectively driving said medial wheel carriage beneath the rack; and
   a second end portion drive mechanism extending from the second end portion wheel carriage, the second end portion drive mechanism being operably connected to the rack and selectively driving the corresponding second end portion wheel carriage beneath the rack.

3. The stair-climbing apparatus according to claim 2, further including a pantograph linkage connecting each of the wheel carriages to a corresponding one of the wheel trucks, the pantograph linkages independently and selectively raising and lowering the corresponding wheel truck attached thereto.

4. The stair-climbing apparatus according to claim 3, wherein each said pantograph linkage comprises a first arm and a second arm, each of the arms having an upper end and a lower end opposite the upper end, each of the upper ends being pivotally connected to the corresponding wheel carriage, each of the lower ends selectively translating laterally within the corresponding wheel truck.

5. The stair-climbing apparatus according to claim 4, wherein each said wheel truck includes mutually parallel first and second tracks, the lower end of each said arm selectively traveling laterally in the corresponding one of the tracks.

6. The stair-climbing apparatus according to claim 5, further comprising:
   a plurality of drive mechanisms, the medial wheel carriage and the second end wheel carriage having a corresponding one of the drive mechanisms attached thereto;
   a plurality of drive motors, each of the wheel trucks having a corresponding one of the drive motors attached thereto;
   a plurality of proximity sensors attached to the wheel trucks and operable to sense proximity and height of a stair riser; and
   a control circuit for raising and lowering the wheel trucks, translating the medial and second end wheel carriage forward and rearward, and driving the wheels forward in response to signals received from the proximity sensors so that the stair-climbing apparatus automatically climbs a flight of stairs.

* * * * *